United States Patent [19]
Martin

[11] Patent Number: 5,933,135
[45] Date of Patent: Aug. 3, 1999

[54] PEN INPUT DEVICE FOR HIGH RESOLUTION DISPLAYS

[75] Inventor: Russel A. Martin, Menlo Park, Calif.

[73] Assignee: Xerox Corporation, Stamford, Conn.

[21] Appl. No.: 08/738,952

[22] Filed: Oct. 24, 1996

[51] Int. Cl.$^6$ ........................................... G09G 5/00
[52] U.S. Cl. .................... 345/179; 345/145; 345/156; 345/180
[58] Field of Search .................... 345/179, 180, 345/157, 145, 160, 156, 181, 182, 183; 382/313, 314; 178/18

[56] References Cited

U.S. PATENT DOCUMENTS

| | | | |
|---|---|---|---|
| 4,698,625 | 10/1987 | McCaskill et al. | 345/145 |
| 4,903,012 | 2/1990 | Ohuchi | 345/145 |
| 5,164,585 | 11/1992 | Lieu | 345/180 |
| 5,227,622 | 7/1993 | Suzuki | 345/180 |
| 5,243,332 | 9/1993 | Jacobson | 345/179 |
| 5,294,792 | 3/1994 | Lewis et al. | 345/180 |
| 5,502,514 | 3/1996 | Vogeley et al. | 345/179 |
| 5,528,263 | 6/1996 | Platzker et al. | 345/156 |

*Primary Examiner*—Jeffery A. Hofsass
*Assistant Examiner*—John Tweel, Jr.
*Attorney, Agent, or Firm*—Fay, Sharpe, Beall, Fagan, Minnich & McKee

[57] ABSTRACT

A pen input system and method is disclosed for identifying a cursor location on a high resolution display. A pen includes a pointer for pointing to a desired point on a display screen for positioning of the cursor. A low resolution locator generally localizes the point to which the pen is pointing at a first location in a host processor, through a cursor control, and positions the cursor at the first location. The pen includes an imager for viewing an image of a portion of the screen including the cursor and the desired point to which the pen is pointing. The host processor can determine a variance between the desired point, which is the center point of the image viewed by the imager in the pen and the actual cursor location. This variance is determined by the processor which then repositions the cursor at the desired point.

14 Claims, 4 Drawing Sheets

PEN INPUT DEVICE FOR HIGH RESOLUTION DISPLAYS

FIELD OF THE INVENTION

The present invention relates generally to data input systems for identifying a particular location on a display device of a computer controlled display. More particularly, the present invention relates to a pointer pen for interacting with a host processor system for selecting a particular location for cursor positioning on a high resolution display. The pointer pen interacts through the processor with the display itself to provide improved accuracy of cursor positioning by enhanced assessment of the direction and location to which the pen is pointing.

BACKGROUND OF THE INVENTION

A wide variety of technologies are known and have been implemented for identifying a desired position on a display screen of a processor-based system. For a CRT display, light pens in communication with the host processor sense the instant of time when a raster scanning beam stimulates a pixel element and so can identify the location to which the pen is pointing. As processing systems have tended to use active matrix liquid crystal displays for their size and power consumption advantages, other types of technologies have been employed that use a locator device separate from the display. In particular, tablets, beams or films are supplementally associated with the basic display. But they have to be calibrated to the display to identify a desired position. Touch screens, where a finger is employed as the pen, have the lowest resolution but are effective in identifying relatively large areas on the screen. Typically, a light beam grid passes over the display screen from top to bottom and from right to left so that when a series of the beams are broken by a finger, the broken beams identify the finger position in the x-y beam grid. Another low resolution system involves opposed films sandwiching a non-conductive layer. Each of the films include a series of signal lines in an x- and y- direction, respectively. When one presses on the film, the films touch to cause a short between the signals lines at that position, essentially closing a switch which can identify the touch position. Both of the foregoing systems are referred to as "touch screens" and are of the lowest resolution type position detection systems.

"Pen-on-screen" systems have improved resolution over touch screens and typically employ a tether line between the pen and a host processor. A tablet is associated with the display screen which has a plurality of electrical contacts about its periphery. When the pen makes a contact with the tablet, the host processor can measure particular resistances between the pen and each of the contacts, and from such resistances can determine the location where the pen is touching the screen. A similar system can be employed with variable capacitances between the touching pen and the peripheral sensors. In this latter system the pen is employed as a contact to generate an electrical signal which is measured by each of the contacts for calculating a relative position. More complex systems have employed an LRC circuit in the pen itself with a series of antennas about the periphery of the tablet, wherein a radio frequency pulse generated by the antennas is sensed by the LRC circuit. The detected resonance in the pen will vary with respect to position on the tablet so that the processor can localize pen position.

A common problem with all of the aforementioned systems is that they employ a separate device which must be calibrated to the actual display screen with which it is associated. The calibration process involves placing an image on the display screen and touching the tablet in different spots until the tablet is calibrated to match the display screen. Such calibration systems have been fairly successful for low resolution displays, where the resolution has approached one-two hundredth of an inch ($\frac{1}{200}$").

Display devices have advanced to have a resolution beyond the resolution of the above-referenced prior known position detection systems. A pixel on a currently available high resolution display (the dpiX 7 Million Pixel ALMCD) is approximately ninety microns ($90\mu$) across—one-two hundred eighty second of an inch ($\frac{1}{282}$"). The prior known systems can not localize relative position down to a particular pixel of this size. Even if the technology were improved to have matching resolution capabilities, the calibration problems would continue to increase so that the systems themselves would have limited economic and practical value.

The present invention contemplates a new and improved system which overcome all the above-referred to problems, and others, to provide a new position identification and cursor locating system which is practical in application, simple and economical to manufacture, readily adaptable to a plurality of display types, and which avoids the necessity of maintenance of close calibration between a position location tablet and the actual display screen.

BRIEF SUMMARY OF THE INVENTION

In accordance with the present invention, there is provided a pen assembly for controlling a position of a cursor on a display device. The assembly includes a pen having a pointer for pointing to a desired point on a screen of the display device where the cursor is desired to be located. A low resolution locator associated with the screen identifies a first location of the pen on the screen relative to the desired point. A cursor controller positions the cursor on the screen at the first location. An imager, preferably comprising a camera disposed in the pen, views an image of a portion of the screen including the first location. A host processor in signal communication with the pen, the low resolution locator and the imager, detects from the image a variance between the first location and the desired point. The cursor controller then repositions the cursor at a second location comprising the desired point.

In accordance with a more limited aspect of the present invention, the imager comprises a camera disposed in the pen in general alignment with the pointing direction of the pen for viewing the desired point and the cursor at the first location identified by the low resolution locator. The detected variance comprises a spacing measured from the cursor at the first location to a central location of the image comprising the desired point. In addition, a variance in sizing of the cursor itself will indicate a particular angle of tilt of the pen, i.e., if the pen is inclined as opposed to being perpendicular to the screen. Accordingly, the cursor will comprise a non-symmetrical configuration, which the host processor can identify for also determining relative orientation.

In accordance with the present invention, a method is provided for obtaining improved accuracy of control of a cursor position on a high resolution display. The method comprises the steps of pointing a pen to a desired point on the display, identifying a first location on the display with a low resolution position detecting system that is generally approximate the desired point, displaying the cursor at the first location, sensing an image of a portion of the display including the desired point and the cursor at that first location, identifying a variance in position between the desired point and the cursor at the first location from the sensed image, and moving the cursor to the desired point to eliminate the variance.

In accordance with a more limited aspect of the present invention, the sensing step comprises disposing a camera in the pen in a manner so that the camera will be aimed at the desired point for viewing the image and the variance. The cursor preferably comprise a non-symmetrical pattern whose image disposition can be indicative of pen tilt and rotation.

One benefit obtained from the present invention is a pen input system which provides high accuracy of control of the cursor position on a high-resolution display.

Another benefit obtained from the invention is obtaining the high accuracy of positioning of the cursor while using a low-resolution locator system.

Yet another benefit of the subject invention is a high-resolution locator system that relates directly to the display itself instead of a calibratable separate device to position the cursor.

Yet another benefit of the subject invention is a cursor locating system which provides high accuracy of location without modification to the display itself.

Other benefits and advantages for the subject new cursor locator system will become apparent to those skilled in the art upon a reading and understanding of this specification.

DETAILED DESCRIPTION OF THE PREFERRED EMBODIMENT

Figure 1:
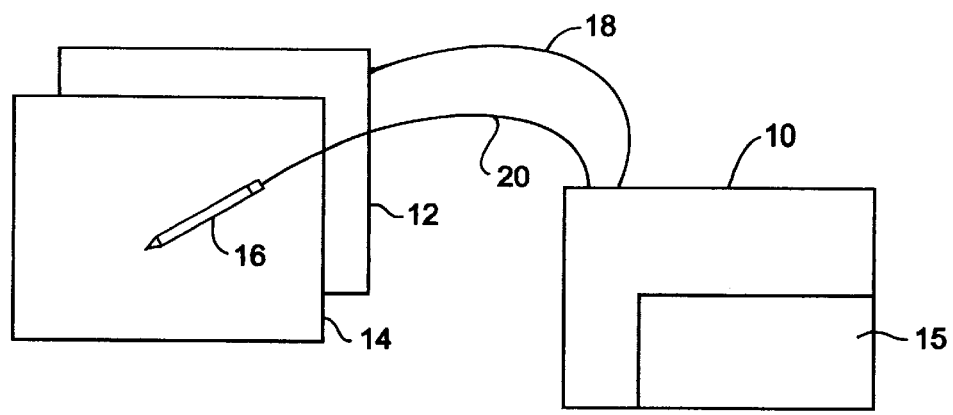
FIG. 1 is a schematic block diagram of the basic elements of the subject invention.

Referring now to the drawings, wherein the showings are for purposes of illustrating preferred embodiments of the invention only, and not for purposes of limiting same, FIG. 1 shows the four basic elements of the invention, the host processor 10, high resolution display 12, a low resolution locator tablet 14, and a pointer pen 16. Both the tablet 14 and pen 16 are in signal communication with the processor 10 through tether lines 18, 20, respectively.

The high resolution display preferably comprises an active matrix liquid crystal display, wherein the pixel sizes are approximately 90 microns across. Of course, the invention is applicable to displays having different, larger or smaller pixel sizes, but the invention is particularly applicable to those systems wherein the display has a resolution higher than can be distinguished by the low resolution tablet 14. The display itself is a conventional, commercially available display, such as an 11.3 inch AMLCD, with a 288×288 color pixel, model number FLC29SVC6S from Fujitsu Microelectronics, San Jose, Calif.

Low resolution tablet 14 is also a conventional device and can be any of the various devices discussed above in the Background of the Invention.

Figure 2:
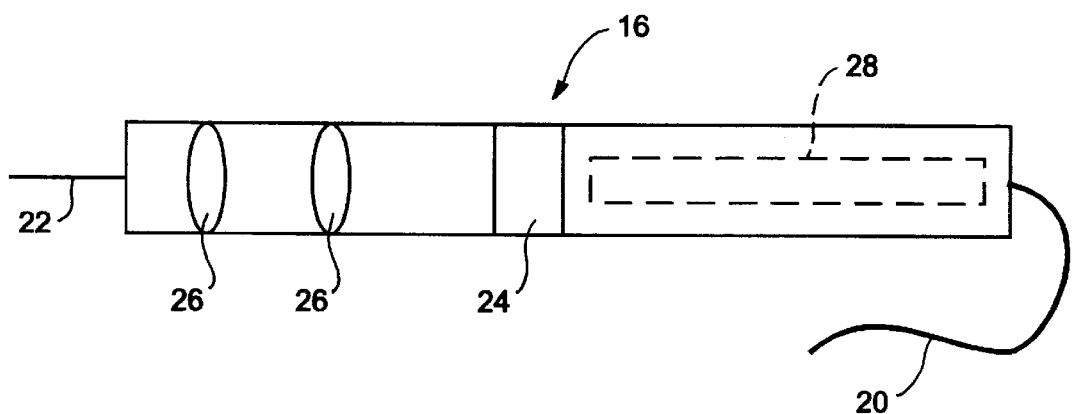
FIG. 2 is a schematic cross-sectional view of a pointer pen comprising the invention.

With particular reference to FIG. 2, it can be seen that the pen 16 is constructed to accomplish two purposes. First, the pointer 22 will cooperate with tablet 14 to indicate a first location for localizing a cursor on the high resolution display 12. Such cursor disposition is accomplished in a conventional manner, through recognition of the first location by the host processor 10 and generating a cursor for disposition on the screen at that point. More importantly, the pen 16 also includes an imaging device 24 which can view the high resolution display 12 and generate an image representative of the portion of the display which is being viewed, and specifically that portion of the display including the first coarse localizing of the cursor by the processor 10. There are many types of commercially available television cameras which are small enough to be included within the pen 16. The pen optics should be such that there is a large depth of field so that tilting the pen will not prevent the display from being imaged. It could be possible to have the lenses 26 be of high f-number to accomplish this. Preferably, the imaging is accomplished with a CCD viewing system and there are many such small CCD cameras commercially available. Optical lenses 26 condition and/or magnify the received image of the display which is communicated to the host processor 10 by electrical control circuit 28 in the pen itself and communicate it to the host processor through cable 20.

Figure 3A:
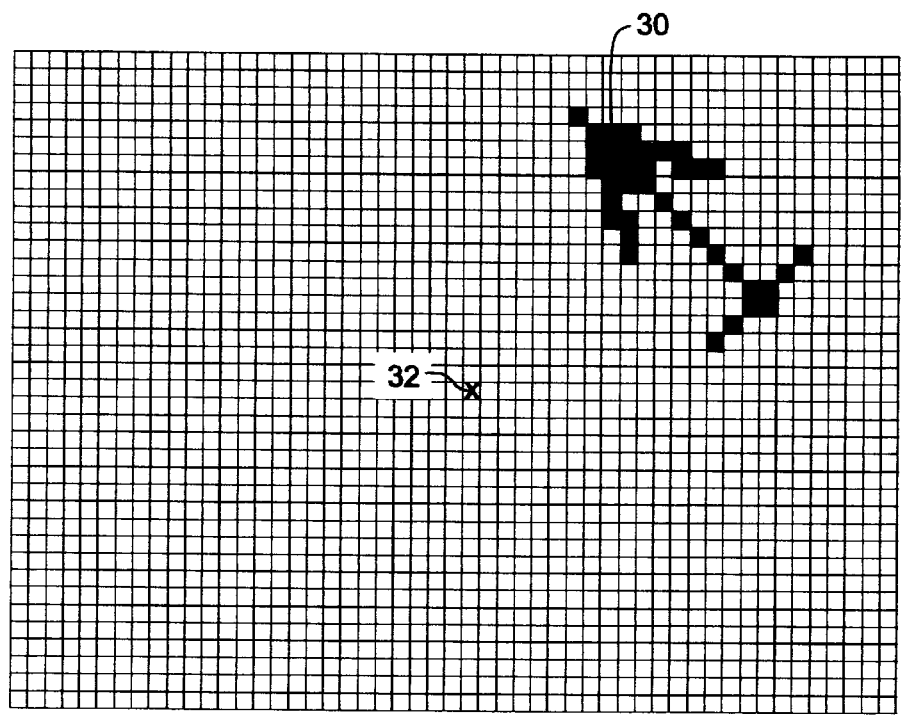
FIG. 3A shows a schematic view of the field of view of the camera in the pointer pen, particularly showing the initial position of the cursor in the pen camera's field of view.
Figure 3B:
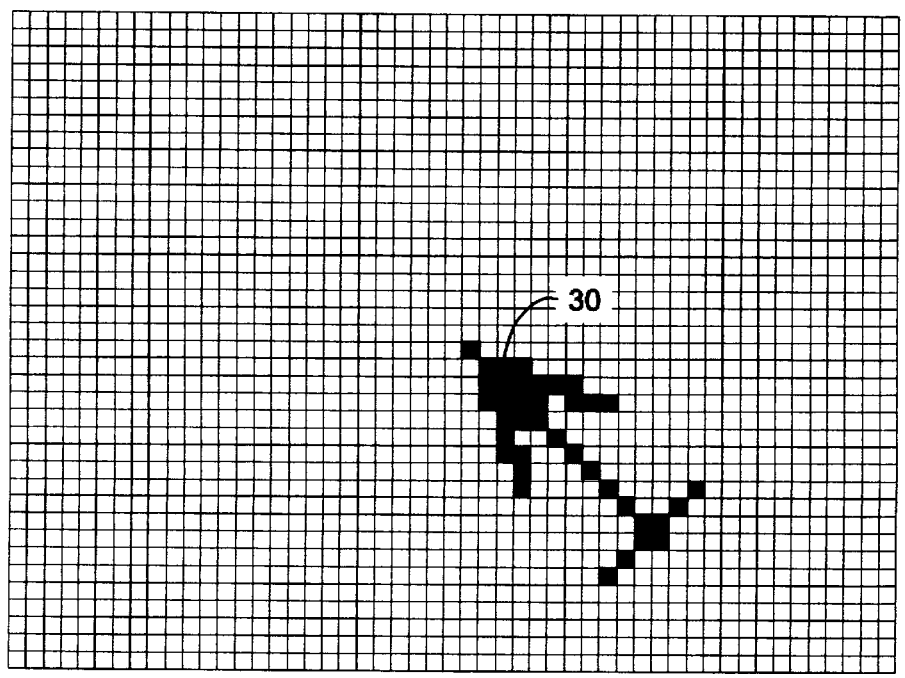
FIG. 3B is similar to FIG. 3A, except that the cursor position has been adjusted to a final desired position.
Figure 4:
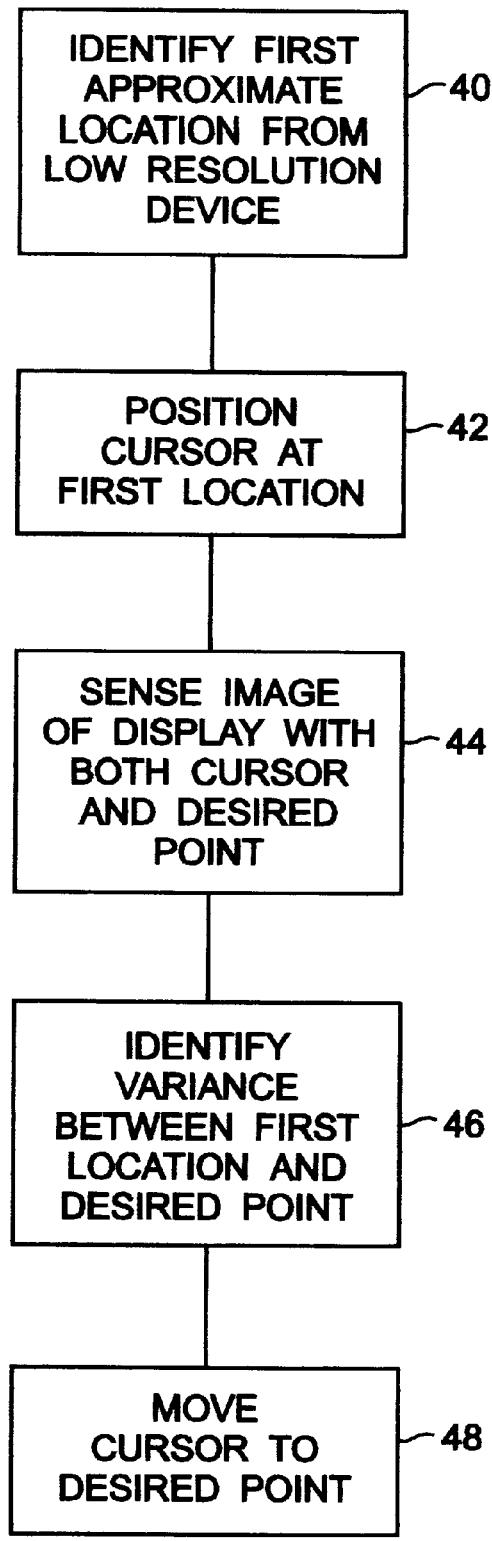
FIG. 4 is a flowchart identifying the sequential method steps for practicing the subject invention.

With particular attention to FIG. 4, the various steps for practicing the method of the subject invention are sequentially listed. The first step 40 is identifying an approximate first location from pen 16 and the low resolution device 14. The host processor will include a controller 15 (FIG. 1) to generate a cursor 30 (FIG. 3A) at the first location that is within a field of view of the camera 24 in the pen 16. The field of view has a center point 32 which is determined by the processor software in accordance with the subject method to be the desired point at which the cursor should be positioned. FIG. 3A illustrates the second step of FIG. 4, of actually positioning 42 the cursor 30 at a first location spaced from the center point 32. The host processor 10 is capable of detecting the variance in position between the position of the cursor illustrated in FIG. 3A and center point 32 from the image generated by the camera 24 in the pen 16. Accordingly, it is important for the third step 44 of the invention to sense an image from the high resolution display 12 that includes both the cursor at the first location, shown in FIG. 3A and the desired point for cursor location 32. In the fourth step 46, the host processor 10 identifies the variance between the first location and the desired point 32 and then repositions 48 the cursor 30 at the desired point, such as is shown in FIG. 3B. Since the desired point 32 is solely determined by the image obtained from the pen, movement of the pen 16 will cause consequent movement of the cursor as the host processor continues to adjust the cursor position to match the desired point. It is realistic to expect, therefore, that cursor movement will be solely controlled by the pen itself as the pen image is changed with movement of the pen and without need for continual localizing identification through the low resolution tablet 14. When the pen stops moving, the cursor will accordingly stop moving.

Figure 5A:
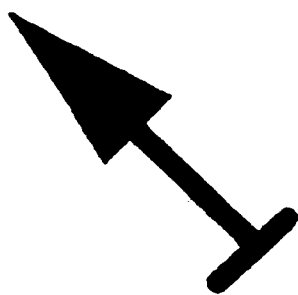
FIG. 5A shows a cursor orientation when the camera is disposed to view the cursor straight down with no rotation.
Figure 5B:
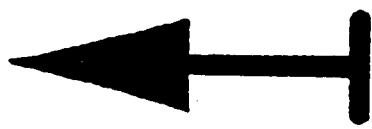
FIG. 5B is a view similar to FIG. 5A, except that the pen has been rotated 45°.
Figure 5C:
FIG. 5C is a view similar to FIG. 5B, except that the pen has been tilted away from the tip of the cursor.

The cursor 30 is intended to comprise a non-symmetrical configuration so that the cursor image can be identified to recognize camera orientation. For example, FIG. 5A shows cursor disposition when the pen is oriented to view the display 12 from a perfect orthogonal direction to the display, and with no pen rotation. FIG. 5B shows what would appear on the camera image if the pen was still orthogonal to the screen, but had been rotated 45°. FIG. 5C shows that the camera has been rotated 45° and further that the pen has been slightly tilted to have a parallax effect on the cursor, wherein the arrowhead has narrowed.

It is within the scope of the invention to identify the orientation and pen tilt from the cursor image itself to further recognize actual pen disposition.

It is another feature of the invention that the optical lenses 26 in the pen can be employed as a magnifier of the display portion image so that camera resolution is actually finer than the pixel size of the display. Accordingly, it is possible for the subject invention to give even more positioning information than the mere location of a single pixel.

"Anti-aliasing" is a term of art for the technique of appearing to draw a single black line between two pixels. For example, the line can visibly appear to be positioned halfway between two pixels if each of the pixels is turned on to fifty percent (50%) illumination. Depending upon the resolution of imaging camera 24, it can thus be possible to position the cursor at a desired point between two adjacent pixels.

Although the invention has been described with a single pen and single cursor system, the invention is equally adaptable to a system having multiple pens and multiple cursors. In such a case, the host processor will be capable of individually identifying each pen 16 of a multiple pen system and appropriately associating a single cursor corresponding to that pen. The advantages of a system having multiple pens and multiple cursors arise from enhanced complexity and freedom of display position identification.

The invention has been described with reference to the preferred embodiments. Obviously, modifications and alterations will occur to others upon the reading and understanding of this specification. It is my intention to include all such modifications and alterations in so far as they come within the scope of the appended claims or the equivalents thereof.

Having thus described the invention, I now claim:

1. A pen assembly for controlling a position of a cursor on a display device comprising:
   a pen including a pointer for pointing to a desired point on a screen of the display device where the cursor is to be located;
   a low resolution locator associated with the screen for identifying a first location indicated by the pen on the screen relative to the desired point;
   a cursor controller for positioning the cursor on the screen at the first location;
   an imager for directly viewing an image of a portion of the screen including the first location;
   a host processor in signal communication with the pen, the low resolution locator and the imager, for detecting from the image a variance between the first location and the desired point and wherein the cursor controller in response to the detected variance repositions the cursor at a second location comprising the desired point.

2. The pen assembly as defined in claim 1 wherein the imager comprises a camera disposed in the pen in a general alignment for viewing the desired point and the cursor at the first location.

3. The pen assembly as defined in claim 1 wherein the detected variance comprises a spacing measured from the cursor at the first location to a central location of the image comprising the desired point.

4. The pen assembly as defined in claim 1 wherein the cursor comprises a nonsymmetrical configuration and the host processor comprises means for detecting a relative position and orientation of the cursor to the desired point.

5. A method for improved accuracy of control of a cursor of an high resolution display comprising the steps:
   pointing a pen to a desired point on the display;
   identifying a first location on the display with a low resolution position detection system wherein the first location is generally approximate the desired point;
   displaying the cursor at the first location;
   sensing an image of a portion of the display including the desired point and the cursor at the first location;
   identifying a variance in position between the desired point and the cursor at the first location from the sensed image; and,
   moving the cursor to the desired point whereby the variance is essentially eliminated.

6. The method as claimed in claim 5 wherein the sensing comprises disposing a camera in the pen wherein the camera will be aimed at the desired point for viewing the image and the variance.

7. The method as claimed in claim 5 wherein the displaying the cursor comprises displaying a nonsymmetrical pattern.

8. The method as claimed in claim 5 wherein the identifying the variance comprises measuring a spacing between the first location and the desired point exclusive of pen tilt, rotation and location.

9. The method as claimed in claim 8 wherein the sensing comprises focusing the portion through an optics lens onto a charge coupled device functioning as the imager, and wherein a host processor computes the spacing and signals a cursor controller for the moving of the cursor to a second location comprising the desired point.

10. The method as defined in claim 5 wherein said moving continually corresponds to said point as the pen is additionally moved for point to a different desired point.

11. A pen input system for identifying a cursor location on a high resolution active matrix liquid crystal display associated with a host processor comprising:
   a pen including a pointer for pointing to a desired point on a screen of the display at where the cursor is desired to be located;
   a low resolution tablet disposed to overlay the screen and calibrated to the screen for identifying a first location on the screen at which the cursor is to be located in response to an input from the pen on the tablet;
   a host processor in signal communication with the pen, the tablet and the display for disposing the cursor at the first location in response to a first locating signal from the pen and tablet; and,
   an imager in association with the pen for generating an image recognizable by the host processor to comprise a portion of the display including the desired point and the first location wherein the host processor identifies a variance between the first location and the desired point from the image and moves the cursor to a second location comprising the desired point.

12. The pen input system as claimed in claim 11 wherein the imager comprises a camera and associated optics assembly disposed in the body of the pen.

13. The pen input system as defined in claim 11 wherein said imager has a resolution finer than said high resolution display.

14. The pen input system as defined in claim 11 wherein said pen comprises a plurality of pens and said cursor comprises a plurality of cursors.

* * * * *